United States Patent
Jeong (10) Patent No.: US 7,286,327 B2
(45) Date of Patent: Oct. 23, 2007

(54) ACTUATOR LATCH MECHANISM FOR HARD DISK DRIVE

(75) Inventor: Ki-tag Jeong, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 540 days.

(21) Appl. No.: 10/981,651

(22) Filed: Nov. 5, 2004

(65) Prior Publication Data

US 2005/0152069 A1     Jul. 14, 2005

(30) Foreign Application Priority Data

Jan. 12, 2004   (KR) ..................... 10-2004-0001960

(51) Int. Cl.
*G11B 5/54* (2006.01)
(52) U.S. Cl. ................................. 360/256.2
(58) Field of Classification Search ............. 360/256.2, 360/256
See application file for complete search history.

(56) References Cited

U.S. PATENT DOCUMENTS

| | | | |
|---|---|---|---|
| 5,363,261 A | 11/1994 | Eckberg et al. | 360/105 |
| 5,448,436 A | 9/1995 | Albrecht | 360/105 |
| 5,663,855 A * | 9/1997 | Kim et al. | 360/256.2 |
| 6,535,357 B1 * | 3/2003 | Misso et al. | 360/256.2 |
| 7,050,269 B2 * | 5/2006 | Hong et al. | 360/256 |

FOREIGN PATENT DOCUMENTS

| | | |
|---|---|---|
| JP | 2000-222838 | 8/2000 |
| JP | 10-2001-0017121 | 3/2001 |
| JP | 2002-100140 | 4/2002 |
| KR | 2002-1835 | 1/2002 |

* cited by examiner

*Primary Examiner*—Angel Castro
(74) *Attorney, Agent, or Firm*—Staas & Halsey LLP

(57) ABSTRACT

An actuator latch mechanism of a hard disk drive locks an actuator when the hard disk drive is not operating, and the actuator includes a swing arm rotatably installed to a base member, a VCM coil coupled to one end portion of the swing arm, and a magnet facing the VCM coil. The actuator latch mechanism includes a notch portion protruding from the end portion of the swing arm; a latch lever pivotally installed to the base member and having a hook engaging the notch portion at one end thereof when the actuator is locked; a protrusion protruding from an edge of the magnet toward the latch lever; a first iron core installed to the end portion of the swing arm and applying a first torque to the swing arm by a flux generated from the protrusions; and a second iron core installed to the other end of the latch lever and applying a second torque to the latch lever by the flux generated from the protrusion.

20 Claims, 8 Drawing Sheets

ACTUATOR LATCH MECHANISM FOR HARD DISK DRIVE

CROSS-REFERENCE TO RELATED APPLICATION

This application claims the benefit of Korean Patent Application No. 2004-1960, filed on Jan. 12, 2004 in the Korean Intellectual Property Office, the disclosure of which is incorporated herein in its entirety by reference.

BACKGROUND OF THE INVENTION

1. Field of the Invention

The present invention relates to a hard disk drive, and more particularly, to an actuator latch mechanism for a hard disk drive, which locks an actuator in a predetermined position when a disk is stopped from rotating, so as to prevent the actuator from drifting due to an external shock.

2. Description of the Related Art

A hard disk drive reads data from and/or writes data on a disk using a read/write head. During the reading and writing operations, the head is shifted to a desired position on the surface of the disk by an actuator, while flying over the recording surface of the spinning disk at a proper height.

When the hard disk drive is not operating, in other words, when the disk is stationary, the head needs to be parked in a position separated from the recording surface of the disk so that the head does not collide with the recording surface of the disk. Such a parking system of the head is mainly classified into a contact start stop (CSS) mode and a ramp load/unload mode. In the CSS mode, a landing zone in which data is not recorded is provided in an inner periphery of the disk, and the head is parked in the landing zone, with the head being in contact with the disk. Meanwhile, in the ramp load/unload mode, a ramp is provided outside of the disk, and the head is parked on the ramp.

However, even when the head is parked in the landing zone of the disk or on the ramp, the actuator may drift by an external shock or vibration, and thus, the head may be shifted toward the recording surface of the disk when separating from the landing zone or the ramp. As a result, the head contacts the recording surface of the disk, and the head and the recording surface of the disk may be damaged. Accordingly, it is necessary to lock the actuator in a proper position, when the disk is stationary and the head is parked in the landing zone or on the ramp. To this end, various actuator latch mechanisms have been proposed.

Figure 1A:
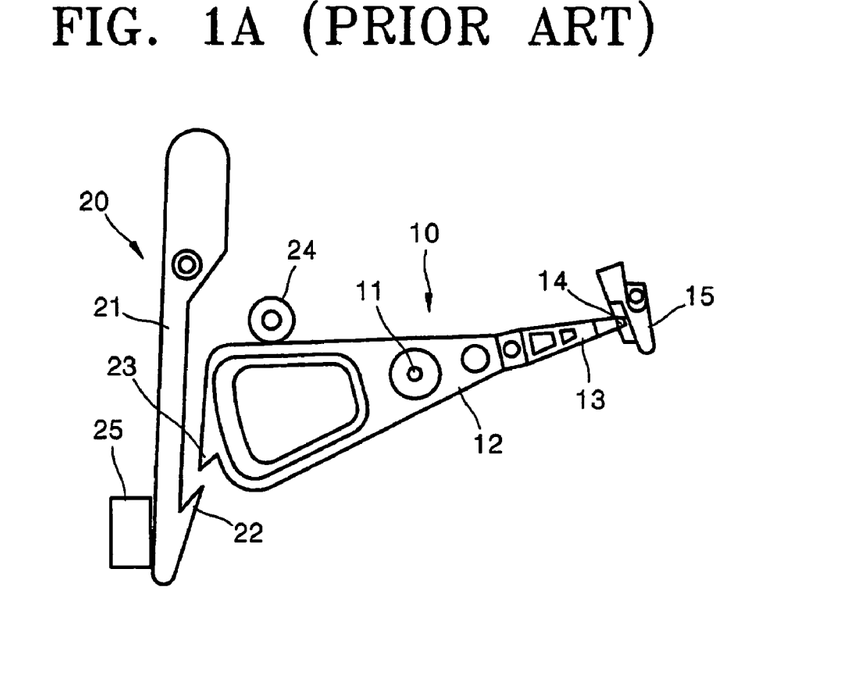
FIGS. 1A, 1B and 1C are views depicting a construction and an operation of a conventional actuator latch mechanism for a hard disk drive.
Figure 1B:
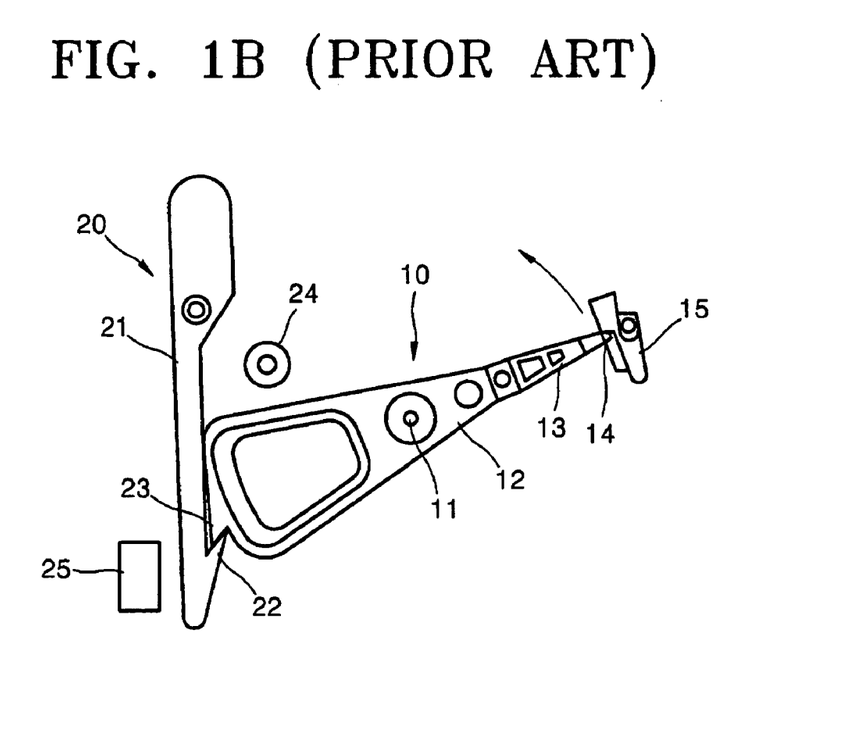
Figure 1C:
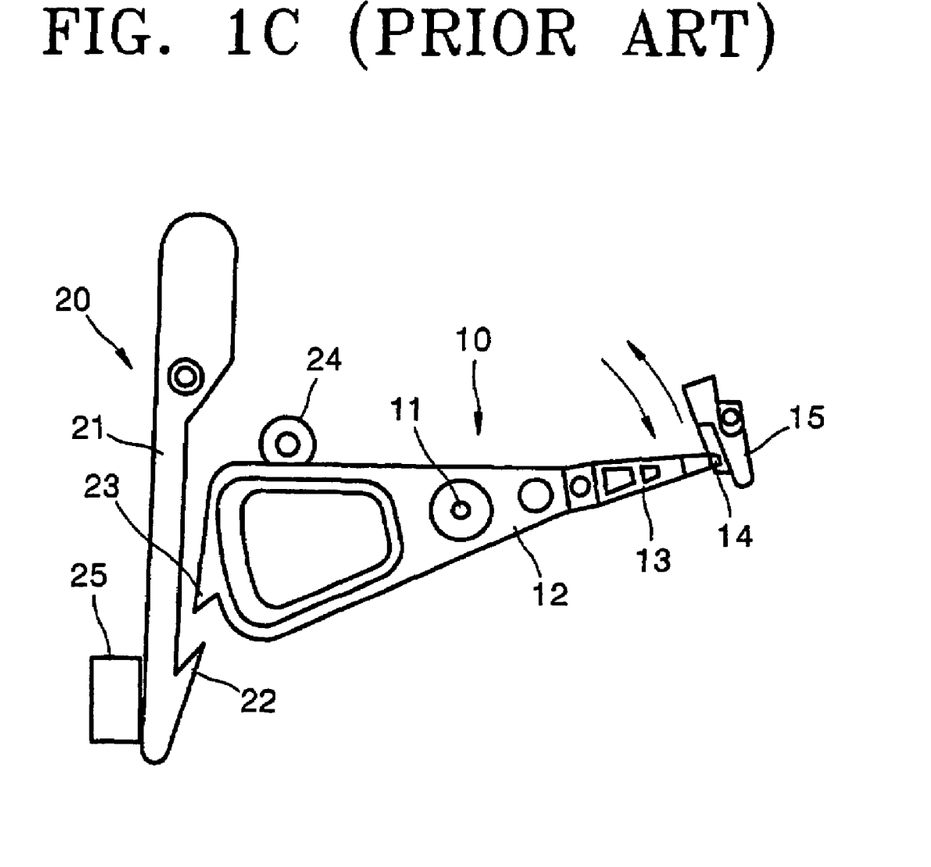

FIGS. 1A, 1B and 1C show an inertial latch mechanism, which is one example of a conventional actuator latch mechanism of a hard disk drive.

Referring to FIG. 1A, the hard disk drive is provided with an actuator 10 moving a read/write head to a desired position on the disk. The actuator 10 includes a swing arm 12 rotatably coupled to a pivot bearing 11, and a suspension 13 installed at one end portion of the swing arm 12 supporting and biasing a slider 14, on which the head is mounted, toward the surface of the disk.

The hard disk drive is also provided with an inertial latch mechanism 20 locking the actuator 10 while the head is parked on a ramp 15. The inertial latch mechanism 20 includes a latch lever 21 pivoted by inertia, a latch hook 22 provided to a front end of the latch lever 21, a notch portion 23 formed on the swing arm 12 of the actuator 10, a crash stop 24 restricting a clockwise rotation of the swing arm 12, and a latch stop 25 for restricting a clockwise pivoting movement of the latch lever 21.

If the hard disk drive receives a clockwise directional shock, the swing arm 12 of the actuator 10 and the latch lever 21 are pivotally rotated in a counterclockwise direction by inertia, as shown in FIG. 1B. Thus, the latch hook 22 engages the notch portion 23, thereby restricting further rotation of the swing arm 12 of the actuator 10. On the contrary, if the hard disk drive receives a counterclockwise directional shock, the swing arm 12 of the actuator 10 and the latch lever 21 are pivotally rotated in a clockwise direction by inertia, as shown in FIG. 1C. At this time, the swing arm 12 is firstly rotated in the clockwise direction until it abuts the crash stop 24. The swing arm 12 is rebounded by the collision, and is thus rotated in the counterclockwise direction. Also, the latch lever 21 is rebounded by the collision between the latch lever 21 and the crash stop 25, and is thus pivoted in the counterclockwise direction. As such, the notch portion 23 is interfered with the latch hook 22 to lock the actuator 10.

However, the conventional inertial latch mechanism 20 described above may operate only by a relatively strong shock, enough to pivot the latch lever 21. Specifically, there is a problem in that if a relatively light shock or vibration is applied to the hard disk drive, the latch lever 21 operated by inertia is not rotated, and thus, the actuator 10 is not locked and drifts. Accordingly, when a light shock is applied to the hard disk drive, it is difficult to reliably lock the actuator 10.

Figure 2A:
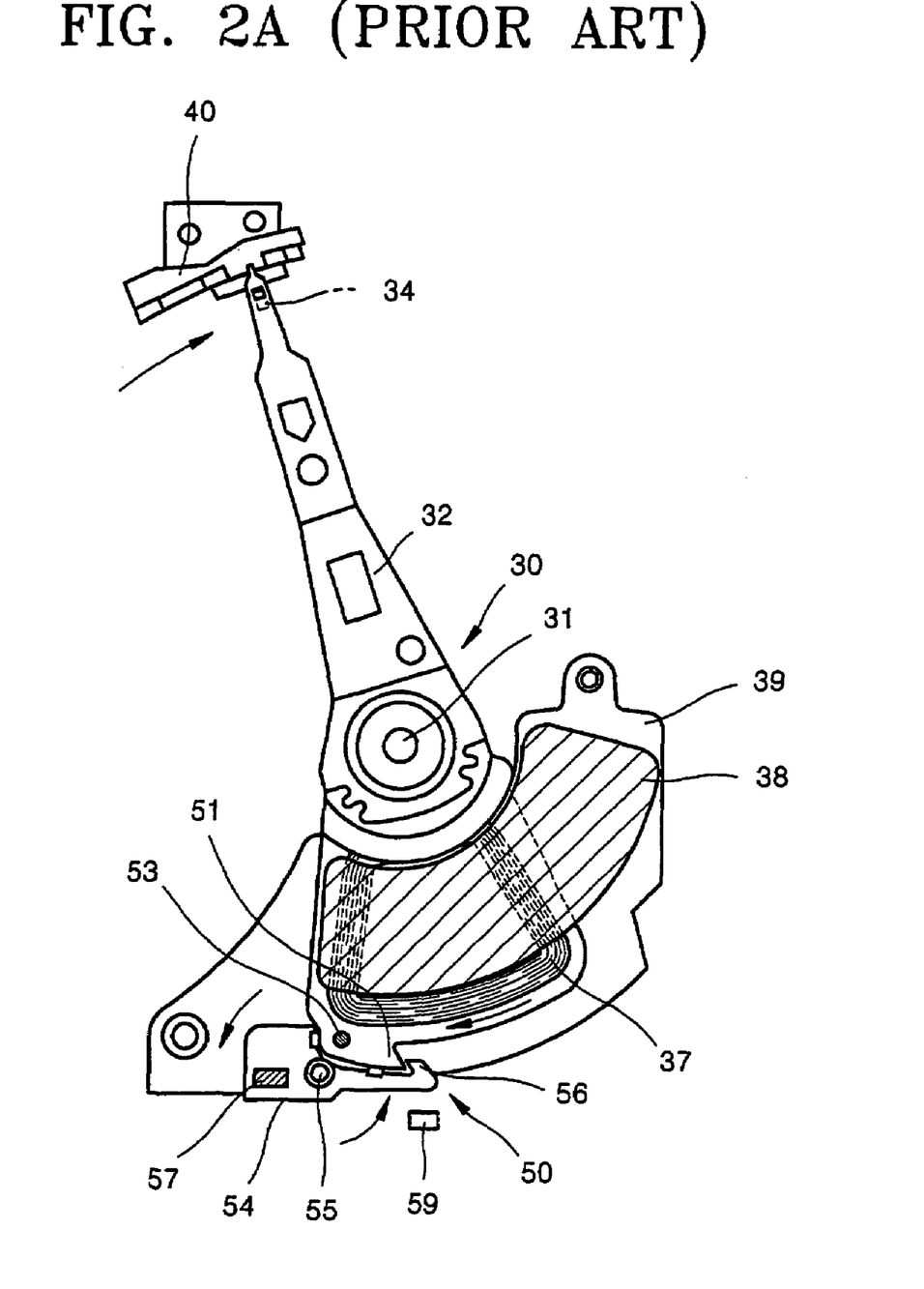
FIGS. 2A and 2B are views depicting a construction and an operation of another conventional actuator latch mechanism for a hard disk drive.
Figure 2B:
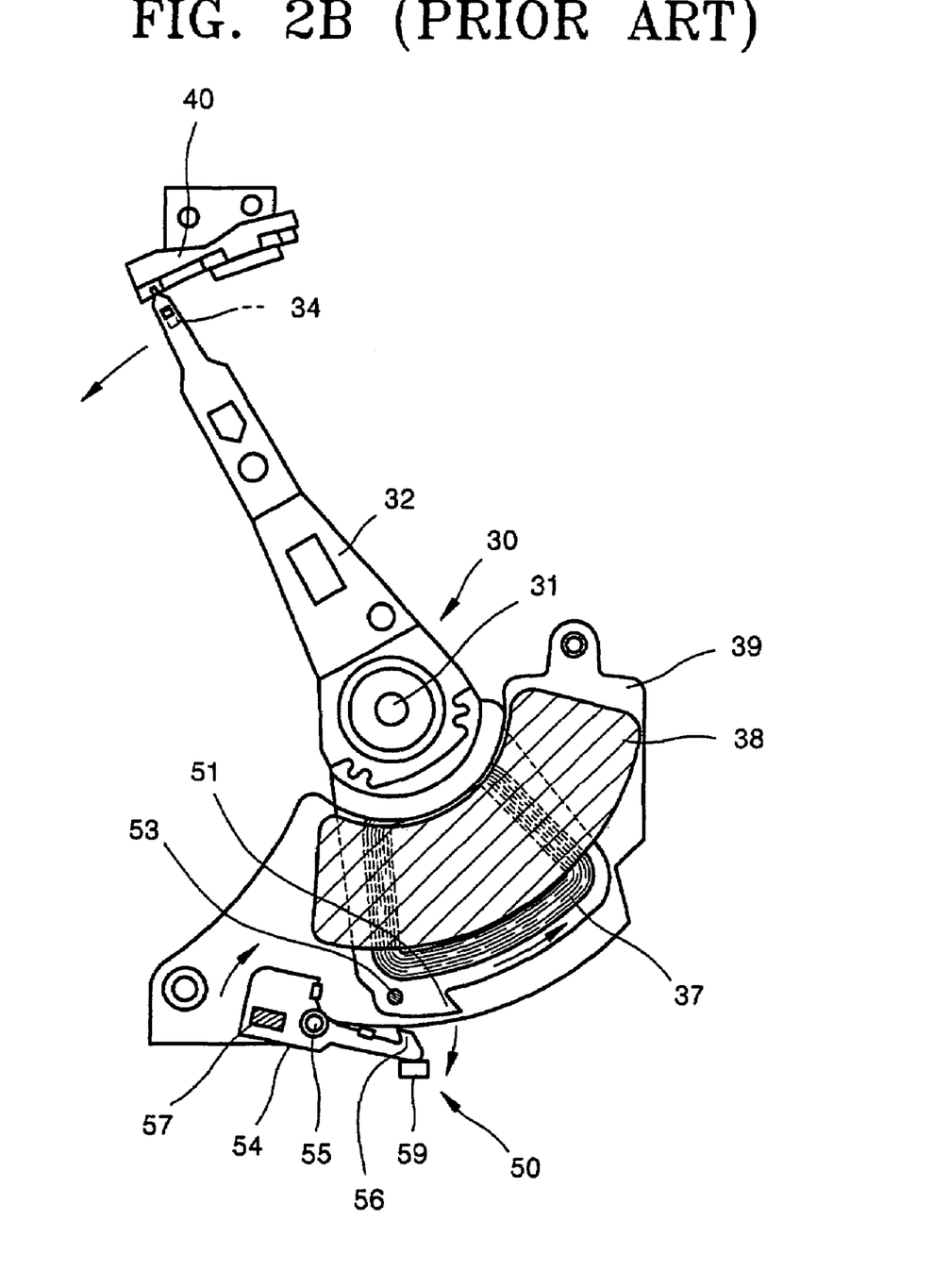

FIGS. 2A and 2B show another actuator latch mechanism addressing the above drawback.

Referring to FIG. 2A, an actuator 30 of a hard disk drive is provided with a voice coil motor (VCM) rotating a swing arm 32. The voice coil motor includes a VCM coil 37 coupled to a rear end portion of the swing arm 32, and a pair of magnets 38 each disposed at an upper portion and at a lower portion of the VCM coil 37 in such a way that the magnets 38 face the VCM coil 37.

An actuator latch mechanism 50 shown in FIGS. 2A and 2B is constructed to lock the actuator 30 by a magnetic flux of the magnet 38, as well as an inertial force. For this purpose, the latch mechanism 50 includes a notch portion 51 formed at an end portion of the swing arm 32, and a latch lever 54 pivotally supported around a pivot shaft 55. The swing arm 32 is provided at the end portion thereof with a first iron core 53 applying a magnetic force between the magnets 38 and the swing arm 32. The first iron core 53 generates a torque to rotate the swing arm 32 in the clockwise direction by the magnetic flux of the magnets 38. The latch lever 54 is provided at one end thereof with a hook 56 to engage the notch portion 51, and at the other end thereof with a second iron core 57 to generate a magnetic force due to the magnets 38. The second iron core 57 generates a torque to pivotally move the latch lever 54 in the clockwise direction by the magnetic flux of the magnets 38. The clockwise pivoting movement of the latch lever 54 due to the torque is restricted by the latch stop 59.

The conventional latch mechanism 50 operates as follows. When the head mounted on the slider 34 is parked on the ramp 40, the swing arm 32 is rotated in the clockwise direction around the pivot bearing 31 by the voice coil motor. At that time, the swing arm 32 pushes the latch lever 54, and so the latch lever 54 is pivoted in the counterclockwise direction. The rotation of the swing arm 32 is stopped at the position where the flux generated from the magnets 38 and the magnetic force generated by the first iron core 53 provided to the swing arm 32 are maximum, and thus, the pivoting movement of the latch lever 54 is stopped. Therefore, as shown in FIG. 2A, the process of parking the head is completed, and simultaneously, the actuator is locked by the latch mechanism 50.

As described above, if the hard disk drive receives a clockwise rotational shock higher than the magnetic force acting between the first iron core 53 and the magnets 38, the swing arm 32 and the latch lever 54 are pivotally moved in the counterclockwise direction by inertia. Accordingly, the hook 56 of the latch lever 54 engages the notch portion 51, thereby restricting further pivoting movement of the swing arm 32 of the actuator 30. On the contrary, if the hard disk drive receives a counterclockwise rotational shock, an inertial torque in the clockwise direction is exerted on the swing arm 32 and the latch lever 54. As shown in FIG. 2A, however, the swing arm 32 is in contact with the latch lever 54, so that the clockwise pivoting movement does not happen.

Meanwhile, if the hard disk drive drives with a light external shock lower than the magnetic force acting between the first iron core 53 and the magnets 38, the swing arm 32 is not pivoted by the magnetic force.

As such, since the actuator latch mechanism 50 utilizes both a magnetic force and inertia, it is possible to reliably lock the actuator for a relatively light shock and vibration, as well as a strong external shock.

Next, referring to FIG. 2B, in order to operate the hard disk drive, the head has to be shifted from the ramp 40 to the recording surface of the disk. To this end, the locking state of the actuator 30 has to be released. At this time, if power is applied to the VCM coil 37 provided at the rear end portion of the swing arm 32, the swing arm 32 overcomes the magnetic force acting between the magnets 38 and the first iron core 53 provided to the swing arm 32, i.e., the latching force, and is thus rotated in the counterclockwise direction. Simultaneously, the latch lever 54 is pivoted in the clockwise direction by the magnetic force acting between the magnets 38 and the second iron core 57, so that the notch portion 51 of the swing arm 32 does not interfere with the hook 56 of the latch lever 54.

In the conventional actuator latch mechanism 50 described above, the magnet 38 typically is shaped to face only the portion of the VCM coil 37 perpendicular to the rotational direction of the swing arm 132. Accordingly, there is a drawback in that the clockwise torque applied to the latch lever 54 is small since a distance between the shaped magnet 38 described above and the second iron core 57 provided at the latch lever 54 is relatively long, and thus, the magnetic flux of the magnets 38 acting on the second iron core 57 is not large. In this case, when the locking state of the actuator 30 is released, the clockwise rotation speed of the latch lever 54 is not faster than that of the counterclockwise rotation of the swing arm 32. As such, the notch portion 51 of the swing arm 32 engages the hook 56 of the latch lever 54.

In order to solve the above problem, the swing arm 32 has to be slowly rotated. However, it is very difficult to slowly rotate the swing arm 32 because a rotational speed of the swing arm 32 is controlled using back electromotive force (back-EMF) generated from the VCM coil 37. If the rotational speed of the swing arm 32 is low, the back electromotive force becomes small. As such, it is very difficult to control the rotational speed of the swing arm 32.

SUMMARY OF THE INVENTION

According to an aspect of the present invention there is provided an actuator latch mechanism for a hard disk drive capable of reliably releasing a locking state of an actuator rotated at a high rotational speed, as well as reliably performing a locking operation of the actuator even in the case of a relatively light rotational shock or vibration.

According to an aspect of the present invention, there is provided an actuator latch mechanism for a hard disk drive, locking an actuator when the hard disk drive is not operating. The actuator may include a swing arm rotatably installed to a base member, a VCM coil coupled to one end portion of the swing arm, and a magnet facing the VCM coil. The actuator latch mechanism may include a notch portion protruding from the end portion of the swing arm; a latch lever pivotally installed to the base member and having a hook engaging the notch portion at one end thereof when the actuator is locked; a protrusion protruding from an edge of the magnet to the latch lever; a first iron core installed at one end portion of the swing arm and applying a first direction of torque to the swing arm by a flux generated from the protrusion; and a second iron core installed to the other end of the latch lever and applying a first direction of torque to the latch lever by the flux generated from the protrusion.

According to an aspect of the present invention, the latch lever may be in contact with the swing arm rotated in the first direction when the actuator is locked, and is pivoted in a second direction opposite to the first direction. Further, the latch lever is pivoted in the first direction by the torque acting on the latch lever when the actuator is unlocked so that it does not interfere with the swing arm rotating in the second direction.

According to an aspect of the present invention the first iron core may be located nearest to the protrusion of the magnet when the actuator is locked.

According to an aspect of the present invention, the torque acting on the swing arm may be higher than the torque acting on the latch lever.

According to an aspect of the present invention the torque acting on the latch lever may be strong enough to pivot the latch lever in the first direction at a speed faster than that of the swing arm rotated in the second direction when the actuator is unlocked.

In addition, the actuator latch mechanism may further include a crash stop restricting the rotation of the swing arm in the first direction, and a latch stop restricting pivoting movement of the latch lever in the first direction. In this case, a sidewall of the base member functions as the latch stop.

With this construction, since a magnetic force acting between the magnet and the second iron core of the latch lever becomes strong, the latch lever is pivoted at a high speed when the actuator is unlocked. Therefore, even though the rotational speed of the actuator is fast, the unlocking operation can be reliably carried out.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
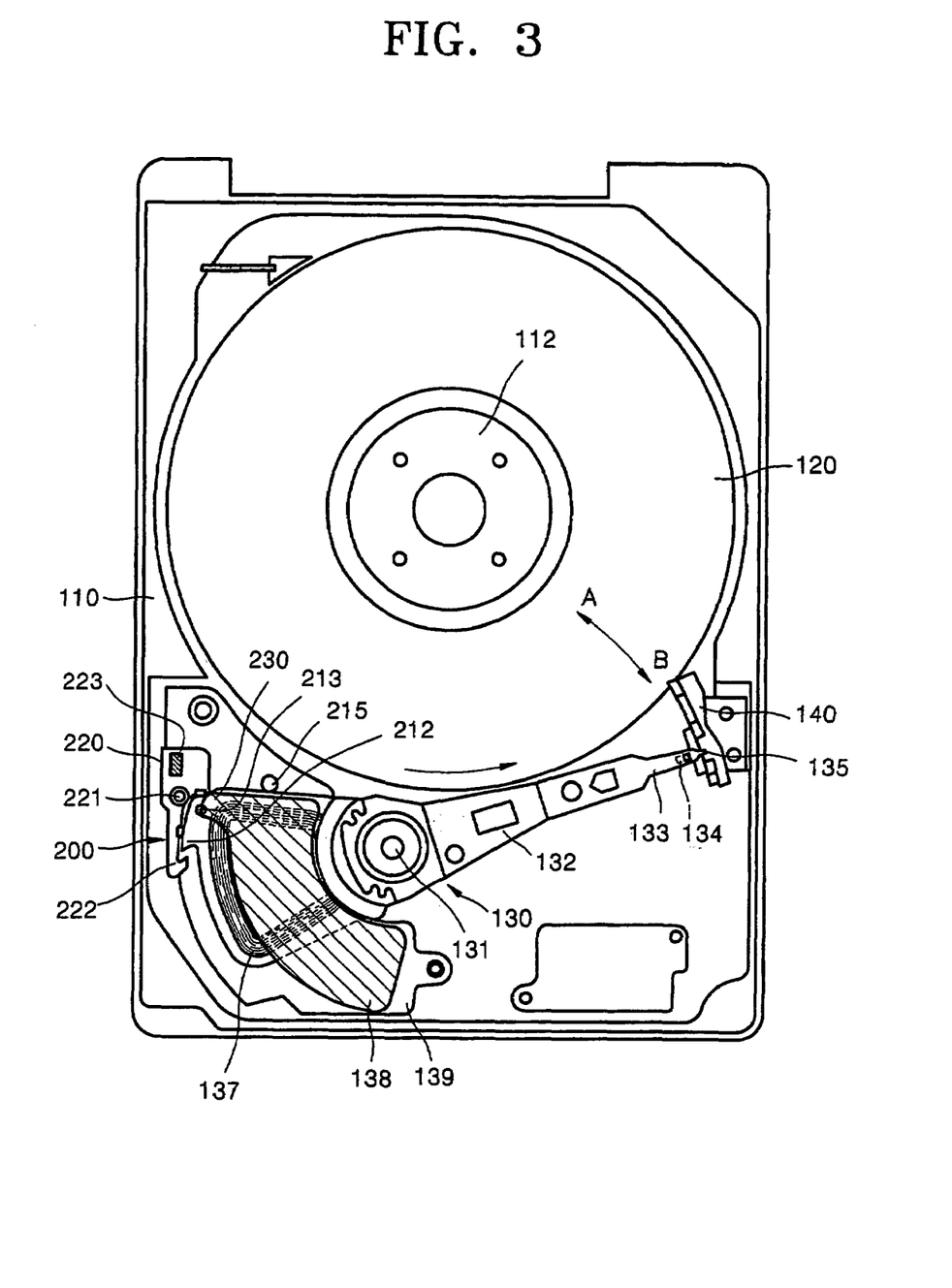
FIG. 3 is a top plan view of a hard disk drive including an actuator latch mechanism according to an embodiment of the present invention.
Figure 4:
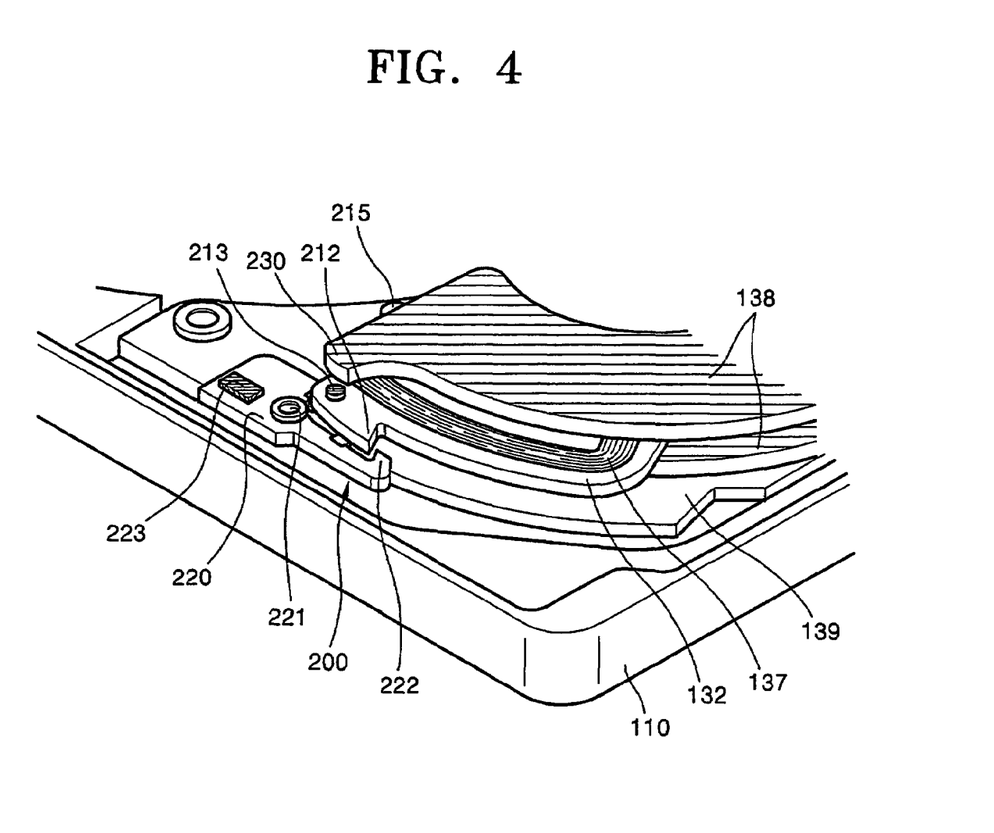
FIG. 4 is an enlarged perspective view of the actuator latch mechanism shown in FIG. 3.

FIG. 3 is a top plan view of a hard disk drive including an actuator latch mechanism according to an embodiment of the present invention, and FIG. 4 is an enlarged perspective view of the actuator latch mechanism shown in FIG. 3.

Referring to FIGS. 3 and 4, the hard disk drive includes a disk 120 mounted on a spindle motor 112, and an actuator 130 moving a read/write head to a predetermined position on the disk. The actuator 130 includes a swing arm 132 rotatably coupled to a pivot bearing 131 installed to a base member 110 of the hard disk drive, a suspension 133 installed to a front end portion of the swing arm 132 supporting and biasing a slider 134, on which the head is mounted, toward a surface of the disk 120, and a voice coil motor (VCM) rotating the swing arm 132.

The voice coil motor includes a VCM coil 137 coupled to a rear end portion of the swing arm 132, and a pair of magnets 138 each disposed above and below the VCM coil 137 in such a way that the magnets 138 face the VCM coil 137. The magnets 138 are attached to and supported by a yoke 139 fixed to the base member 110. The magnets 138 may be disposed only above or below the VCM coil 137. The voice coil motor configured as described above is controlled by a servo control system. The swing arm 132 is rotated in a direction according to Fleming's left-hand rule by the interaction between a current input to the VCM coil 137 and the magnetic force generated by the magnets 138. Specifically, when the disk 120 starts spinning when the hard disk drive is turned on, the voice coil motor rotates the swing arm 132 in a counterclockwise direction (indicated by an arrow A) to move the head on a recording surface of the disk 120. On the contrary, when the disk 120 stops spinning when the hard disk drive is turned off, the voice coil motor rotates the swing arm 132 in a clockwise direction (indicated by an arrow B) to move the head away from the disk 120.

At this time, the head moving away from the recording surface of the disk 120 is parked on a ramp 140 installed outside of the disk 120. Specifically, when the disk 120 stops rotating, the swing arm 132 is rotated in the direction indicated by the arrow B by the voice coil motor, such that an end-tap 135 formed at an end portion of the suspension 133 is parked on the ramp 140.

The hard disk drive includes an actuator latch mechanism 200 according to an embodiment of the present invention.

The actuator latch mechanism 200 locks the actuator 130 when the hard disk drive stops operating, i.e., when the disk 120 stops rotating, so as to maintain a state where the head mounted to the actuator 130 is parked on the ramp 140. Specifically, the actuator latch mechanism 200 prevents the head from shifting out of the ramp 140 and moving over the disk 120 when the actuator 130 rotates due to an external shock or vibration, in the state where the disk 120 does not rotate. If the head is moved over the disk 120 when the disk 120 is stationary, there is a high possibility that the head may directly contact the surface of the disk 120, thereby damaging the surface of the disk 120 and the head.

The actuator latch mechanism 200 according to an embodiment of the present invention locks the actuator 130 by use of inertia and a flux of the magnets 138. Specifically, the actuator latch mechanism 200 according an embodiment of the present invention includes a notch portion 212 and a first iron core 213 provided at a rear end portion of the swing arm 132, a latch lever 220 pivotally installed to the base member 110 and having a hook 222 and a second iron core 223, and protrusions 230 protruding from the magnets 138.

The VCM coil 137 is coupled to the rear end portion of the swing arm 132, as described above. The rear end portion of the swing arm 132 is made of plastic molding. The notch portion 212 provided at the rear end portion of the swing arm 132 may be formed in such a way as to protrude from the rear end portion of the swing arm 132 by the plastic molding.

The latch lever 220 is pivotally coupled to a pivot shaft 221 installed to the base member 110, and is provided at a rear end portion of the latch lever 220 with the hook 222. Preferably, though not necessarily, the latch lever 220 is made of a non-magnetic substance, for example, the plastic molding, such that it is not affected by a magnetic force of the magnets 138. If the latch lever receives a rotational shock in a first direction, for example, a clockwise direction, or a second direction, for example, a counterclockwise direction, the inertia acts on the latch lever 220 to be pivoted in the counterclockwise or clockwise direction. The hook 222 of the latch lever 220 engages the notch portion 212 of the swing arm 132 by inertia, thereby preventing the free rotation of the swing arm 132. The operation of the latch lever 220 will be described in more detail hereinafter.

Preferably, though not necessarily, the first iron core 213 is provided at the rear end portion of the swing arm 132 in a position where a distance from the rear end portion to the protrusion 230 of the magnet 138 is the shortest distance when the actuator 130 is locked. The first iron core 213 may be made of a magnetic substance, preferably, though not necessarily, ferromagnetic steel, so that a magnetic force acts between the protrusions 230 of the magnets 138 and the first iron core 213. The first iron core 213 applies a torque to the swing arm 132 in the clockwise direction. Specifically, the flux generated from the protrusions 230 of the magnets 138 acts on the first iron core 213, and thus, the torque in the clockwise direction is applied to the swing arm 132 by the magnetic force between the first iron core 213 and the protrusion 230. The clockwise torque applied to the swing arm 132 locks the actuator 130 for a relatively light shock and vibration.

The second iron core 223 is provided at the rear end portion of the latch lever 220. The second iron core 223 may be made of a magnetic substance, preferably, though not necessarily, ferromagnetic steel, so that a magnetic force acts between the protrusions 230 of the magnets 138 and the second iron core 223. The second iron core 223 applies a torque to the latch lever 220 in the clockwise direction. Specifically, the flux generated from the protrusions 230 of the magnets 138 acts on the second iron core 223, and thus, the torque in the clockwise direction is applied to the latch lever 220 by the magnetic force between the second iron core 223 and the protrusion 230.

The protrusions 230 extend to the latch lever 220 from the edges of the magnets 138. A distance between the magnet 138 and the first iron core 213 and a distance between the magnet 138 and the second iron core 223 are shorter than those in the prior art due to the protrusions 230 configured as described above. Accordingly, since a stronger flux generated from the protrusions 230 acts on the first iron core 213 and the second iron core 223, a stronger torque is applied to the swing arm 132 and the latch lever 220. If the torque acting on the swing arm 132 is higher than the torque acting on the latch lever 220 by properly adjusting the dimensions of the first iron core 213 and the second iron core 223, the locking state of the actuator 130 can be reliably maintained. The torque acting on the latch lever 220 rotates the latch lever 220 in the clockwise direction at a speed higher than the counterclockwise rotational speed of the swing arm 132 when the actuator 130 is unlocked. If the clockwise torque acting on the latch lever 220 becomes high, the latch lever 220 is rapidly rotated when the actuator 130 is unlocked. Therefore, even though the rotational speed of the swing arm 132 is fast, the unlocking operation can be reliably carried out. The operation will be described hereinafter.

The actuator latch mechanism 200 according to an aspect of the present invention further includes a crash stop 215 restricting a clockwise rotation of the swing arm 132. The crash stop 215 may protrude a predetermined distance from the yoke 139, and engages one side of the rear end portion of the swing arm 132 to restrict the clockwise rotation of the swing arm 132, when the actuator 130 is parked in the parking position.

Also, the actuator latch mechanism 200 includes a latch stop restricting a clockwise movement of the latch lever 220. In the present invention, a sidewall of the base member 110 functions as the latch stop.

The operation of the actuator latch mechanism according to an aspect of the present invention will now be described with reference to FIGS. 3, 5 and 6.

Figure 5:
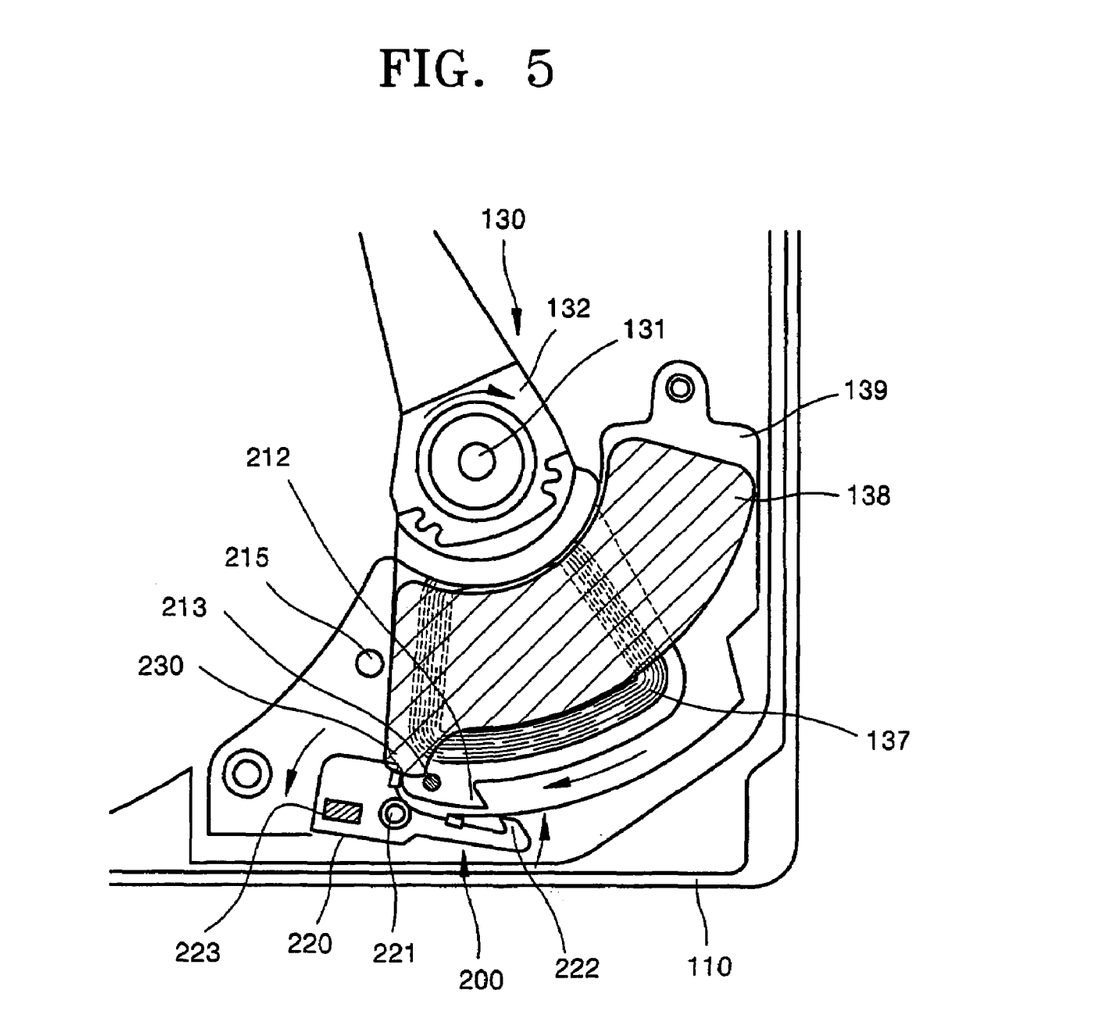
FIG. 5 is a view depicting a locking operation of an actuator latch mechanism according to an embodiment of the present invention.
Figure 6:
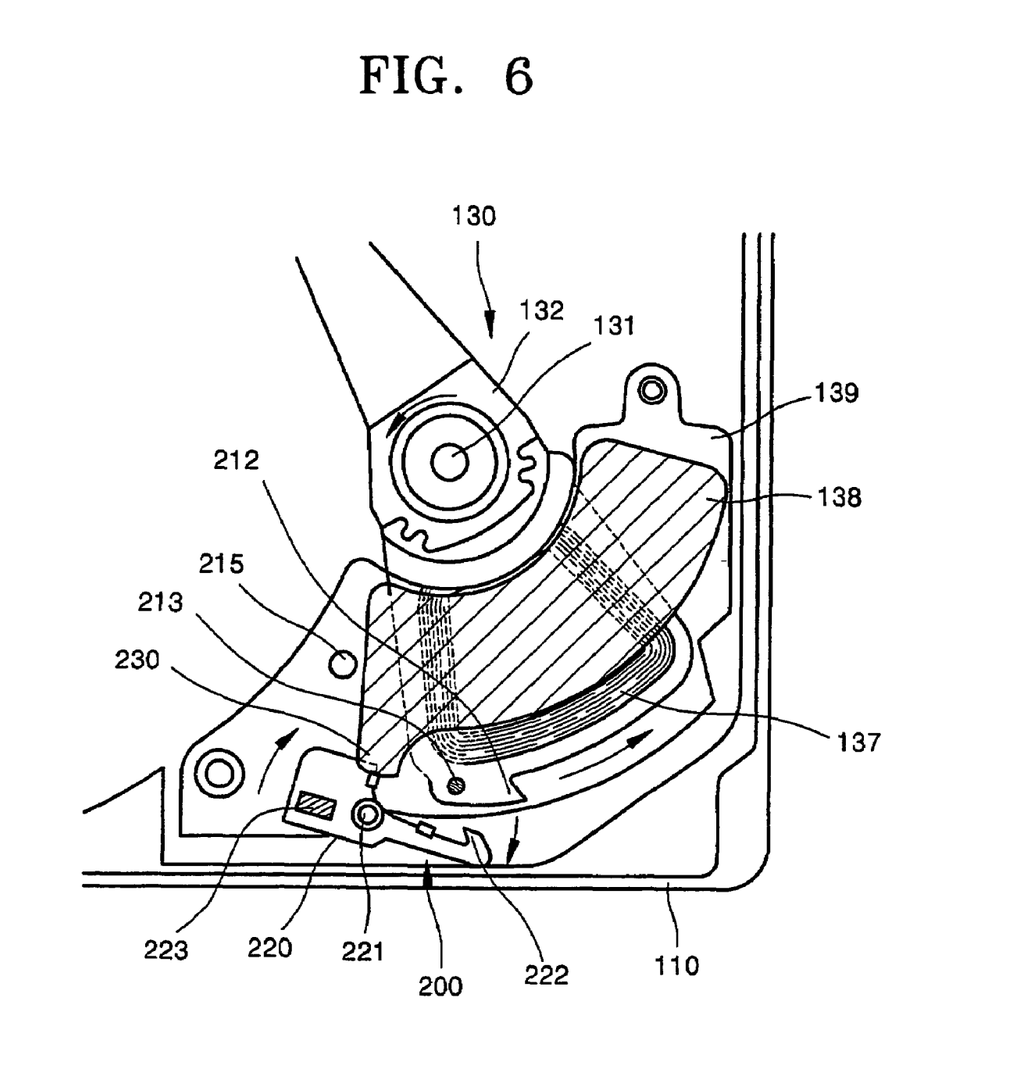
FIG. 6 is a view depicting an unlocking operation of an actuator latch mechanism according to an embodiment of the present invention.

FIG. 5 is a view depicting the locking operation of the actuator latch mechanism according to an aspect of the present invention, and FIG. 6 is a view depicting the unlocking operation of the actuator latch mechanism according to an aspect of the present invention.

First, referring to FIG. 5, when the operation of the hard disk drive is stopped and the head mounted on the slider 134 is parked on the ramp 140, the swing arm 132 is rotated in the clockwise direction around the pivot bearing 131 by the voice coil motor. At this time, the side wall of the rear end portion of the swing arm 132 is in contact with the rear end portion of the latch lever 220, so that the latch lever 220 is pushed by the swing arm 220 rotated in the clockwise direction and so is pivoted in the counterclockwise direction. The clockwise rotation of the swing arm 132 is stopped in a position where the flux generated the magnetic force acting between the protrusions 230 of the magnets 138 and the first iron core 213 provided at the swing arm 132 are maximum, i.e., in the position where a distance between the first iron core 213 and the protrusion 230 is the shortest, and thus the counterclockwise pivoting movement of the latch lever 220 is stopped. At this time, when the crash stop 215 is installed, the clockwise rotation of the swing arm 132 may be stopped at a proper position.

Therefore, as shown in FIG. 3, the parking process of the head is completed, and simultaneously, the locking of the actuator 130 by the actuator latch mechanism 200 according to an aspect of the present invention is accomplished. At that time, even though the rotational driving force applied to the swing arm 132 via the voice coil motor is released, the locking state of the actuator 130 can be maintained by the clockwise torque applied to the swing arm 132 by the first iron core 213 and the protrusions 230 of the magnets 138. As described above, since the torque acting on the swing arm 132 is higher, the locking state of the actuator 130 can be reliably maintained.

When the head is parked as described above, if the hard disk drive receives a clockwise rotational shock higher than the torque applied to the swing arm 132 by the first iron core 213 and the protrusions 230 of the magnets 138, the swing arm 132 and the latch lever 220 are pivoted in the counterclockwise direction by inertia. As such, the hook 222 of the latch lever 220 engages the notch portion 212, so that the swing arm 132 is not further rotated. On the contrary, if the hard disk drive receives a counterclockwise rotational shock, the inertial torque in the clockwise direction acts on the swing arm 132 and the latch lever 220. However, since the swing arm 132 is in contact with the latch lever 220, as shown in FIG. 3, the clockwise rotation does not happen.

If the hard disk drive receives a shock lower than the torque applied to the swing arm 132 by the first iron core 213 and the protrusions 230 of the magnets 138, the swing arm 132 is not rotated by the torque, thereby maintaining the locking state of the actuator 130.

As such, since the actuator latch mechanism 200 utilizes both a magnetic force and inertia, it is possible to reliably lock the actuator 130 when a relatively light shock and vibration occur, as well as when a strong external shock occurs.

Referring to FIG. 6, in order to operate the hard disk drive, the power is applied to the VCM coil 137 installed at the rear end portion of the swing arm 132, and the swing arm 132 overcomes the clockwise torque to rotate in the counterclockwise direction. Simultaneously, since the latch lever 220 is pivoted in the clockwise direction by the clockwise torque applied by the second iron core 223 and the protrusions 230 of the magnets 138, the notch portion 212 of the swing arm 132 rotated in the counterclockwise direction does not interfere with the hook 222 of the latch lever 220. The clockwise rotation of the latch lever 220 is restricted by the sidewall of the base member 110. In other words, the sidewall of the base member 110 functions as a latch stop to restrict the clockwise pivoting of the latch lever 220.

At that time, according to an embodiment of the present invention, the clockwise torque applied to the latch lever 220 by the protrusions 230 formed on the magnets 138 becomes large, so that the rotational speed of the latch lever 220 is faster than that in the prior art. Therefore, even though the counterclockwise rotational speed of the swing arm 132 is fast, the notch portion 212 of the swing arm 132 does not engage the hook 222 of the latch lever 220, thereby achieving the reliable unlocking operation. The fast rotational speed of the swing arm 132 causes a back electromotive force to be generated in the VCM coil 137, thereby allowing the stable servo control.

As described above, in the actuator latch mechanism for the hard disk drive according to an embodiment of the present invention, the magnetic force acting between the magnets and the second iron core of the latch lever increases, so that the latch lever is rotated faster when the actuator is unlocked. Therefore, even though the rotational speed of the actuator is fast, the unlocking operation can be reliably achieved. The high rotational speed of the actuator causes the back electromotive force to be generated in the VCM coil, thereby achieving the stable servo control.

In addition, since the actuator latch mechanism utilizes both the magnetic force and inertia, it is possible to reliably lock the actuator in the case of a relatively light shock and vibration, as well as in case of a strong external shock.

While the present invention has been particularly shown and described with reference to exemplary embodiments depicted in the drawings, it will be understood by those of ordinary skill in the art that various changes and modifications in form and details may be made therein without departing from the spirit and scope of the present invention. For example, although the actuator latch mechanism according to an embodiment of the present invention is applied to a ramp mode of the hard disk drive, the present invention can be also applied to a CSS mode of the hard disk drive. Therefore, the true spirit and scope for protection of the present invention will be defined by the following claims.

What is claimed is:

1. An actuator latch mechanism of a hard disk drive, the actuator latch mechanism locking an actuator when the hard disk drive is not operating, the actuator including a swing arm rotatably installed to a base member, a Voice Coil Motor (VCM) coil coupled at one end portion of the swing arm, and a magnet facing the VCM coil, the actuator latch mechanism comprising:
   a notch portion protruding from the one end portion of the swing arm;
   a latch lever pivotally installed to the base member and having a hook engaging the notch portion at the one end portion of the swing arm when the actuator is locked;
   a protrusion protruding from an edge of the magnet toward the latch lever;
   a first iron core installed in the one end portion of the swing arm and applying a first torque to the swing arm by a flux generated from the protrusion; and
   a second iron core installed at one end of the latch lever and applying a second torque to the latch lever by the flux generated from the protrusion.

2. The actuator latch mechanism as claimed in claim 1, wherein the latch lever is in contact with the swing arm rotated in a first direction when the actuator is locked.

3. The actuator latch mechanism as claimed in claim 2, wherein the swing arm is pivoted in a second direction opposite to the first direction and the latch lever is pivoted in the first direction by the second torque acting on the latch lever when the actuator is unlocked so that the latch lever does not interfere with the swing arm rotating in the second direction.

4. The actuator latch mechanism as claimed in claim 3, wherein the second torque acting on the latch lever pivots the latch lever in the first direction at a speed faster than that of the swing arm rotated in the second direction when the actuator is unlocked.

5. The actuator latch mechanism as claimed in claim 2, wherein the first iron core is located nearest to the protrusion of the magnet when the actuator is locked.

6. The actuator latch mechanism as claimed in claim 2, wherein the first torque acting on the swing arm is higher than the second torque acting on the latch lever.

7. The actuator latch mechanism as claimed in claim 1, wherein the latch lever is made of a non-magnetic substance.

8. The actuator latch mechanism as claimed in claim 1, further comprising a crash stop restricting rotation of the swing arm in a first direction.

9. The actuator latch mechanism as claimed in claim 1, further comprising a latch stop restricting a pivoting movement of the latch lever in a first direction.

10. The actuator latch mechanism as claimed in claim 9, wherein a sidewall of the base member is the latch stop.

11. The actuator latch mechanism as claimed in claim 1, wherein inertia and the flux generated from the protrusion lock the actuator in a fixed position.

12. The actuator latch mechanism as claimed in claim 1, wherein the first and second iron cores are made of a magnetic substance.

13. The actuator latch mechanism as claimed in claim 12, wherein the magnetic substance includes ferromagnetic steel.

14. An actuator latch mechanism comprising:
   a swing arm rotatably installed to a base member and having a notch portion protruding from one end portion of the swing arm;
   a latch lever pivotally installed at the base member and having a hook engaging the notch portion of the swing arm when the latch mechanism is locked;
   a magnet having a protrusion protruding from an edge of the magnet toward the latch lever;
   a first iron core installed in the one end portion of the swing arm and applying a first torque to the swing arm by a flux generated from the protrusion; and
   a second iron core installed at one end of the latch lever and applying a second torque to the latch lever by the flux generated from the protrusion.

15. The actuator latch mechanism as claimed in claim 14, wherein the swing arm further comprises a Voice Coil Motor (VCM) coil coupled to the one end portion.

16. The actuator latch mechanism as claimed in claim 15, wherein the magnet faces the VCM coil.

17. The actuator latch mechanism as claimed in claim 14, wherein the swing arm is located between first and second magnets.

18. The actuator latch mechanism as claimed in claim 14, wherein the latch lever is made of a non-magnetic substance.

19. The actuator latch mechanism as claimed in claim 14, wherein the first and second iron cores are made of a magnetic substance.

20. The actuator latch mechanism as claimed in claim 19, wherein the magnetic substance includes ferromagnetic steel.

* * * * *